US009944797B2

(12) United States Patent
Yoo et al.

(10) Patent No.: US 9,944,797 B2
(45) Date of Patent: Apr. 17, 2018

(54) GLASS FIBER-REINFORCED HOT-MIX ASPHALT MIXTURE, AND MANUFACTURING METHOD THEREOF

(71) Applicant: KOREA INSTITUTE OF CIVIL ENGINEERING AND BUILDING TECHNOLOGY, Goyang-si, Gyeonggi-do (KR)

(72) Inventors: Pyeongjun Yoo, Goyang-si (KR); Booil Kim, Goyang-si (KR); Taeyoung Yun, Seoul (KR); Byungsik Ohm, Goyang-si (KR); Jiyoung Choi, Goyang-si (KR); Jongeun Baek, Seoul (KR); Taewoo Kim, Seoul (KR); Sangmin Ham, Seoul (KR)

(73) Assignee: Korea Institute of Civil Engineering and Building Technology, Goyang-si, Gyeonggi-do (KR)

( * ) Notice: Subject to any disclaimer, the term of this patent is extended or adjusted under 35 U.S.C. 154(b) by 0 days.

(21) Appl. No.: 15/312,223

(22) PCT Filed: Aug. 11, 2014

(86) PCT No.: PCT/KR2014/007459
§ 371 (c)(1),
(2) Date: Nov. 18, 2016

(87) PCT Pub. No.: WO2015/182823
PCT Pub. Date: Dec. 3, 2015

(65) Prior Publication Data
US 2017/0081516 A1 Mar. 23, 2017

(30) Foreign Application Priority Data
May 27, 2014 (KR) .................... 10-2014-0063864

(51) Int. Cl.
| | |
|---|---|
| *C08K 9/00* | (2006.01) |
| *C08L 95/00* | (2006.01) |
| *C03C 25/10* | (2018.01) |
| *C03C 25/24* | (2018.01) |
| *E01C 7/18* | (2006.01) |
| *C03C 25/30* | (2018.01) |
| *C04B 14/42* | (2006.01) |
| *C04B 26/26* | (2006.01) |
| *E01C 7/26* | (2006.01) |
| *C04B 111/00* | (2006.01) |

(52) U.S. Cl.
CPC .............. *C08L 95/00* (2013.01); *C03C 25/10* (2013.01); *C03C 25/103* (2013.01); *C03C 25/24* (2013.01); *C03C 25/30* (2013.01); *C04B 14/42* (2013.01); *C04B 26/26* (2013.01); *E01C 7/18* (2013.01); *E01C 7/26* (2013.01); *C04B 2111/0075* (2013.01); *C08L 2555/50* (2013.01); *C08L 2555/52* (2013.01); *C08L 2555/86* (2013.01)

(58) Field of Classification Search
CPC .......... C08L 95/00; C03C 25/30; C04B 26/26
See application file for complete search history.

(56) References Cited

U.S. PATENT DOCUMENTS

| | | | |
|---|---|---|---|
| 2002/0052440 A1 | 5/2002 | Tochioka et al. | |
| 2003/0148083 A1* | 8/2003 | Tanaka ..................... | C08J 3/226 428/292.1 |
| 2007/0017255 A1* | 1/2007 | Grove-Nielsen ......... | B09B 3/00 65/482 |
| 2010/0004358 A1* | 1/2010 | Hashiba ................... | B27N 1/02 524/13 |
| 2012/0136082 A1* | 5/2012 | Daiss ...................... | C08F 30/08 521/143 |

FOREIGN PATENT DOCUMENTS

| | | |
|---|---|---|
| JP | 05-140464 A | 6/1993 |
| JP | 3564710 B2 | 9/2004 |
| KR | 10-2002-0030274 A | 4/2002 |
| KR | 10-2009-0022835 A | 3/2009 |
| KR | 10-0933302 B1 | 12/2009 |

OTHER PUBLICATIONS

Machine Translation of JP 05-140464.*

* cited by examiner

*Primary Examiner* — Hannah J Pak
(74) *Attorney, Agent, or Firm* — Rabin & Berdo, P.C.

(57) ABSTRACT

Disclosed is a glass fiber-reinforced composite material, an asphalt mixture using the same, and a manufacturing method thereof, the method comprising manufacturing, as a mixed structure, a bundle type fiber reinforcing material by coating with a polypropylene resin; a scrap reinforcing material having pellet or particle shaped glass fiber scrap, the glass fiber scrap having economical and outstanding physical properties and several strands of glass fiber; and adding the same to a hot-mix asphalt mixture, thereby capable of being injected at a plant construction site in a simple manner and improving the performance of the asphalt by preventing the phenomenon of the fiber becoming entangled within the produced hot asphalt mixture.

5 Claims, 10 Drawing Sheets

GLASS FIBER-REINFORCED HOT-MIX ASPHALT MIXTURE, AND MANUFACTURING METHOD THEREOF

TECHNICAL FIELD

The present invention relates to a composite reinforcing material using glass fiber, and an asphalt mixture using the same, and more particularly, to a glass fiber composite reinforcing material composed of a pellet shaped scrap reinforcing material in which glass fiber scrap is coated with an outer covering material such as an asphalt binder or polypropylene and a rod-shaped fiber reinforcing material in which a plurality of glass fiber bundles are coated with a resin material, and contributing to improvement of various performances by being mixed in a hot-mix asphalt mixture, an asphalt mixture using the same, and a manufacturing method thereof.

BACKGROUND ART

In order to extend the service life of asphalt pavement, various methods have been introduced until now, wherein a method using a chemical modifier and a method using a geogrid are representative methods.

The method using the chemical modifier is a method in which viscosity of an asphalt binder increases by melting petroleum-based (SBS or SBR) polymer particles in the asphalt binder. This method exhibits an advantageous effect on rut resistance of an asphalt mixture at a high temperature, but is difficult to be practically applied since problems of excessive costs, difficulty in quality control, increase in energy costs according to increase in a temperature for producing a mixture, early loss of a polymer network structure by high reactivity with oxygen due to an existing unsaturated carbon double bond (C=C) in the styrene or polybutadiene segment, the possibility of cracking by an increase in fragility of a material at a low temperature and the like are accompanied.

And the method using the geogrid is a construction method in which geotextiles woven in the form of a grid are installed in places. This method exhibits advantageous effects of increasing reflective cracking resistance performance from a lower layer and rut resistance and the like, but there are weak points such as a construction period is prolonged since a construction process is complex, construction costs increase, and also when the highest stress concentration or shear deformation occurs inside 3 to 5 cm of a surface layer from an upper surface, actions therefor cannot be taken.

Besides, when bicomponent conjugated fiber for a hot asphalt (Korean Patent No. 10-0933302) is used in a reinforcing method using reinforcing fiber, in a process for injection production by mixing a polypropylene (PP) and polyethylene terephthalate (PET) resin having different melting points from each other, there are problems such as: increased costs due to increased loss of raw materials because of frequent fractures in fibers caused by resins exhibiting different elongations; a serious balling phenomenon in which fibers are entangled when mixed; and a great difficulty of injecting fiber manually at a hot-mix asphalt mixture plant.

DISCLOSURE

Technical Problem

The present invention is for solving the above problems, and an object of the present invention is to provide a glass fiber composite reinforcing material which is composed of composition in which a pellet or particle shaped reinforcing material using glass fiber scrap having economical and outstanding physical properties is mixed with a rod-shaped fiber reinforcing material made in the form of a bundle by coating several strands of glass fiber with a resin material such as polypropylene, can be conveniently injected at a hot-mix asphalt plant by having a specific gravity similar to that of a natural aggregate, and can improve the performance of an asphalt mixture by preventing the phenomenon of fibers becoming entangled within a produced hot asphalt mixture; an asphalt mixture using the same; and a manufacturing method thereof.

Technical Solution

For achieving the objects, a glass fiber composite reinforcing material according to the present invention includes a pellet-shaped scrap reinforcing material in which glass fiber scrap made by pulverizing a bulk of discarded glass fiber, which is a byproduct in the middle of manufacturing a roving glass fiber, is coated with an outer covering material; and a rod-shaped fiber reinforcing material in which a glass fiber bundle having a plurality of glass fiber strands is coated with a resin material.

According to an aspect of the present invention, a hot-mix asphalt mixture which is made by mixing the composite reinforcing material, an aggregate, and an asphalt binder is provided.

According to another aspect of the present invention, as a method for manufacturing the hot-mix asphalt mixture, a method for manufacturing the hot-mix asphalt mixture including a step of mixing a composite reinforcing material with an aggregate and performing dry mixing for a set time; and a step of mixing a mixture of the composite reinforcing material and the aggregate with an asphalt binder heated to a predetermined temperature and performing wet mixing for a set time is provided.

Advantageous Effects

It can be seen that a hot-mix asphalt mixture mixed with the composite reinforcing material of the present invention has effects of increasing interlocking force between aggregates according to uniform dispersion of glass fibers, increasing the toughness of a mixture according to a bridging effect between aggregates, and increasing viscosity of an asphalt binder by a polypropylene resin.

As a result, when a road construction is performed using the hot-mix asphalt mixture according to the present invention, there are advantageous effects of increasing structural durability performance by solving problems such as plastic deformation, fatigue cracking, pothole damage and the like in addition to economic efficiency by not using a stone powder when a hot asphalt is produced at a plant.

MODES OF THE INVENTION

Hereinafter, an exemplary embodiment of a glass fiber composite reinforcing material according to the present invention, an asphalt mixture using the same, and a manufacturing method thereof will be described in detail with reference to the accompanying drawings.

Figure 1:
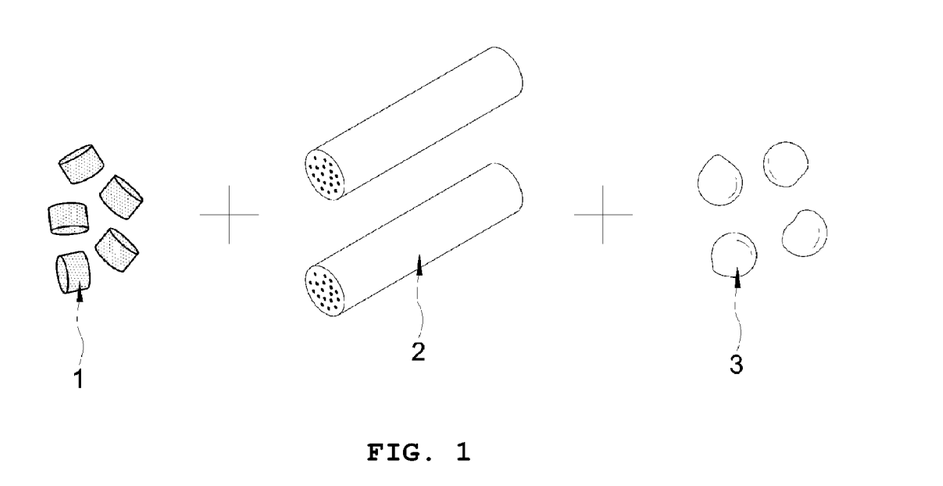
FIG. 1 is a view illustrating the composition of a glass fiber composite reinforcing material according to an exemplary embodiment of the present invention.

Referring to FIG. 1, a glass fiber composite reinforcing material of the present invention has a composition including a pellet or aggregate shaped scrap reinforcing material 1 in which glass fiber scrap made by pulverizing a bulk of discarded glass fiber is coated with an outer covering material, and a rod-shaped fiber reinforcing material 2 in which a glass fiber bundle having a plurality of glass fiber strands is coated with a resin material. The fiber reinforcing material 2 has a structure in which a glass fiber bundle composed of 400 to 500 glass fiber strands having a diameter of 10 to 20 μm of each fiber is coated with a resin material.

The scrap reinforcing material 1 has a pellet or aggregate shape in a predetermined size by the glass fiber scrap being coated with an asphalt binder or a polypropylene resin.

The glass fiber scrap is made in the form of fine powder by pulverizing, with a ball miller, the loss generated by cutting glass fiber strands in a process for producing glass fiber. Although some of the glass fiber scraps are recycled, most are an industrial byproduct to be discarded. The composition of the glass fiber scrap includes a byproduct generated when E-glass fiber having an alkali content of less than 1% is produced, is an amorphous artificial mineral fiber, and has been prescribed as a non-carcinogen which is harmless to humans and is classified as Group 3 by the International Agency for Research on Cancer (IARC). In the case of a particle size distribution of the glass fiber scrap, it is preferable that glass fiber scrap having a particle size distribution residual proportion in which a content of glass fiber which is maintained in the form of fiber having a thickness of 0.1 mm or less and a length of 5 mm or less is about 5% or less of a 53% residue on a 45 μm sieve and a 47% part passing through a 45 μm sieve be adopted.

Since the glass fiber scrap has very small particles and dust is generated when the glass fiber is injected at an asphalt plant, it is difficult to inject a precisely measured reinforcing material, and since the glass fiber scrap has very fine particles, when a hot-mix asphalt mixture is produced at a plant, after an asphalt binder is sprayed and injected at a temperature of about 180 ° C., it is difficult to effectively coat glass fiber scrap with a binder in a wet mixing process generally performed for about 1 to 2 minutes. For this reason, in the present invention, a method in which glass fiber scrap is produced in a pellet or aggregate shape by being coated with an asphalt binder or polypropylene at room temperature, and then is mixed to an asphalt mixture has been suggested.

When the scrap reinforcing material 1 is produced by glass fiber scrap being coated with an asphalt binder, 95 to 97% by weight of glass fiber scrap is mixed with 3 to 5% by weight of a general asphalt binder based on the weight of glass fiber scrap at room temperature, stirred for 2 to 3 minutes, cured for 2 to 3 hours at room temperature, and then is subjected to manual kneading compaction, and then manufactured in the form of pellets by cutting into an appropriate size.

As such, the scrap reinforcing material 1 in which glass fiber scrap is coated with the asphalt binder provides a characteristic in which when an asphalt concrete mixture is produced by the scrap reinforcing material 1 being injected at an asphalt plant at a temperature of 160 to 170° C., an amount of asphalt increases by 0.1 to 0.2% based on an amount of mix designed asphalt of a mixture by adding the asphalt binder of the scrap reinforcing material 1. As a result, an amount of effective asphalt coated with an aggregate is caused to increase, and thus an advantage of preventing a pothole is provided.

However, when glass fiber scrap is coated by mixing with an asphalt binder, manufacturing may become difficult due to manual asphalt binder coating, kneading compaction and the like. To overcome this problem, as described above, glass fiber scrap may be manufactured in advance by being coated with polypropylene.

Figure 2:
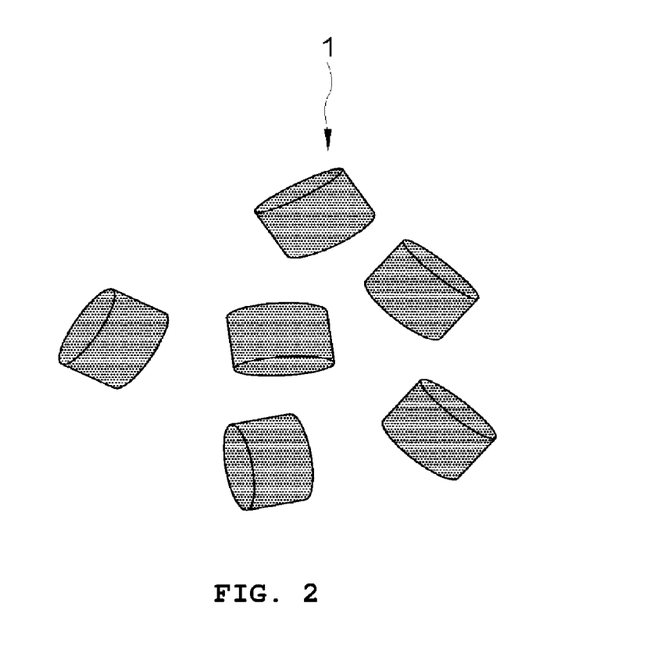
FIG. 2 is a view illustrating a pellet-shaped scrap reinforcing material in which glass fiber scrap is coated with an asphalt binder as a composite reinforcing material according to the present invention.
Figure 3:
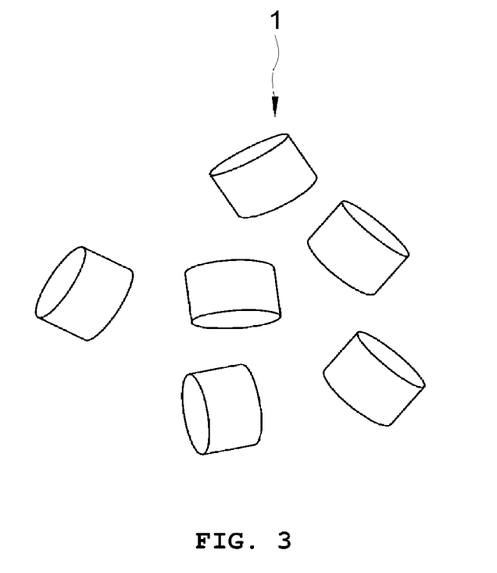
FIG. 3 is a view illustrating a pellet-shaped scrap reinforcing material in which glass fiber scrap is coated with a polypropylene resin as a composite reinforcing material according to the present invention.

When a glass fiber scrap particle coated with polypropylene is produced, 97 to 98% by weight of glass fiber scrap is stirred with 2 to 3% by weight of a polypropylene resin, based on the weight of glass fiber scrap, having a melting point in a range of 140 to 150° C., at room temperature for 2 to 3 minutes, and cut into an appropriate size (for example, about 5 mm) through an extrusion molding machine to produce a pellet-shaped scrap reinforcing material 1 in which glass fiber scrap is coated with polypropylene (referring to FIG. 2).

As described above, the scrap reinforcing material 1 coated with the asphalt binder or polypropylene has an effect of being capable of substituting for 2 to 3% of a stone powder filler when a hot-mix asphalt mixture is manufactured a plant. That is, in the case of a general mix design of a hot-mix asphalt mixture, it has been prescribed that 20 to 30 kg of a stone powder per 1,000 kg of the weight of a mixture is used, and in the case of a glass fiber scrap reinforcing material 1 being substituted, there are advantages of being capable of producing a hot-mix asphalt mixture in a plant without an additional stone powder management and injecting process and being economical.

Figure 4:
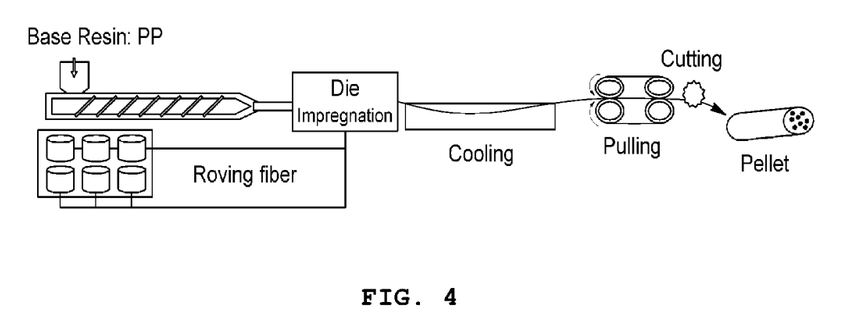
FIG. 4 is a view illustrating schematically the configuration of an extrusion molding machine for extruding a fiber reinforcing material of a composite reinforcing material according to the present invention.
Figure 5:
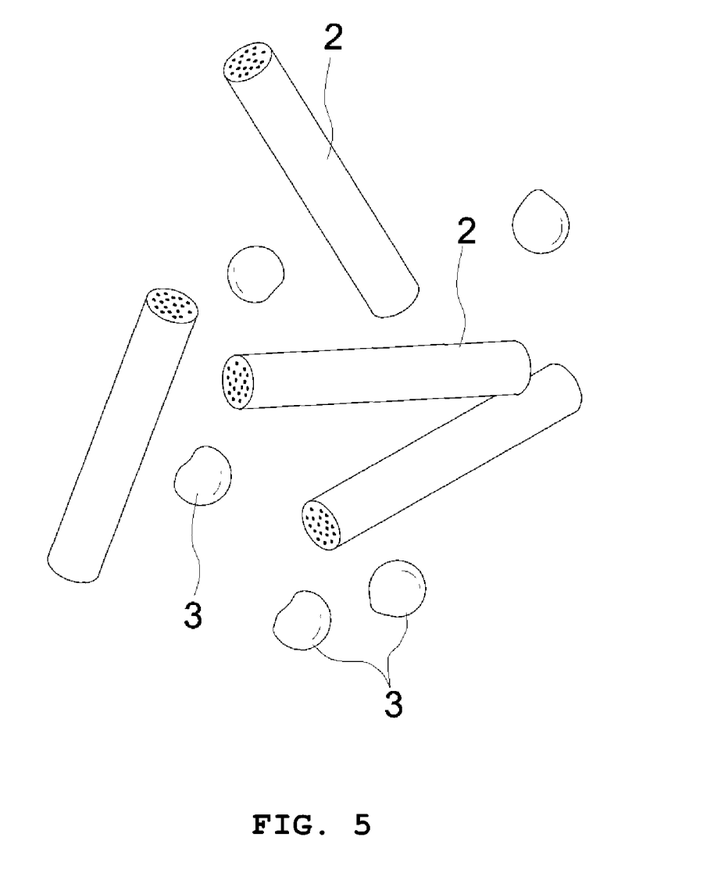
FIG. 5 is a view illustrating a rod-shaped fiber reinforcing material and a resin reinforcing material of a composite reinforcing material according to the present invention.

Meanwhile, the fiber reinforcing material 2 is produced using an extrusion molding machine as illustrated in FIG. 4 in order to improve toughness and tensile strength of a hot-mix asphalt mixture in a tensile direction. The fiber reinforcing material 2 is made by coating 400 to 500 roving fibers having a diameter of 10 to 20 μm with polypropylene melted at 180 to 200° C., curing while immersed in water, and then being cut into a length of 10 to 20 mm. FIG. 5 illustrates an example of a rod-shaped fiber reinforcing material 2 produced through the extrusion molding machine as above. It is preferable that the fiber reinforcing material 2 have a circular rod shape, but various shapes such as oval, polygon or the like may be formed.

Glass fiber laid inside a polypropylene resin of the fiber reinforcing material 2 has an alkali content of less than 1%, a specific gravity in a range of 2.4 to 2.6, tensile strength of 500 to 1000 GPa, 2 to 4% elongation at break, a thickness of 10 to 20 μm, and a length of 10 to 20 mm. It is preferable that an amount of glass fiber and polypropylene have a weight ratio of 1:1 to 1.5:1 in a fiber reinforcing material 2 coated with polypropylene, and a glass fiber composite reinforcing material of the present invention may include additionally a resin reinforcing material 3 in the form of a grain composed of a polypropylene resin in order to adjust an amount of glass fiber and polypropylene. Such grains of a resin reinforcing material 3 composed of a polypropylene resin play an additive role when a final hot asphalt mixture is produced in a plant, thereby improving mixing workability of a mixture and viscosity of an asphalt binder (referring to FIG. 6).

The glass fiber composite reinforcing material of the present invention composed as above works to improve performance of a mixture by being mixed in a hot-mix asphalt mixture. A method for manufacturing the hot-mix asphalt mixture by mixing the glass fiber composite reinforcing material of the present invention in asphalt is as follows.

First, a scrap reinforcing material 1 and a fiber reinforcing material 2 are mixed with an aggregate, and then dry mixing is performed for a set time (about 30 seconds). In this case, the scrap reinforcing material 1 is mixed in an amount of 1 to 2 wt % based on a total weight of a hot-mix asphalt mixture and the fiber reinforcing material 2 is mixed in an amount of 1 to 2 wt % based on a total weight of a hot-mix asphalt mixture a target aggregate gradation without the use of a generally used stone powder. Through a dry mixing step of aggregate and reinforcing materials which have a similar specific gravity, the scrap reinforcing material 1, the fiber reinforcing material 2, and the aggregate are uniformly dispersed.

Subsequently, when a mixture of the scrap reinforcing material 1, the fiber reinforcing material 2, and the aggregate which are mixed through dry mixing is mixed with a general asphalt binder heated at 160 to 170° C. (penetration index: 50 to 100), and then wet mixing is performed for a set time (about 1 minute), the manufacture of a hot-mix asphalt mixture is completed.

As described above, when a hot-mix asphalt mixture is manufactured by mixing the glass fiber composite reinforcing material of the present invention with an aggregate and asphalt binder, an effect of glass fiber being uniformly dispersed in an asphalt mixture may be obtained because entanglement between glass fibers is prevented, and an economical effect may be also obtained because a hot-mix asphalt mixture may be manufactured without the use of a stone powder filler.

The following table illustrates particle size distribution of a hot-mix asphalt mixture in which glass fiber is not mixed at all (Comparative Example 1), a hot-mix asphalt mixture in which glass fiber is mixed in an amount of 1 wt % and 2 wt % respectively (Comparative Examples 2 and 3), and a hot-mix asphalt mixture in which a scrap reinforcing material 1 and a fiber reinforcing material 2 which are coated with polypropylene are mixed in an amount of 2 wt % respectively as a glass fiber composite reinforcing material according to the present invention and a stone powder filler is not mixed (Exemplary Embodiment 1).

TABLE 1

| added amount | 0 wt % (Comparative Example 1) | | glass fiber: 1 wt % (Comparative Example 2) | | glass fiber: 2 wt % (Comparative Example 3) | | fiber reinforcing material: 2 wt % + scrap reinforcing material: 2 wt % (Exemplary Embodiment 1) | |
|---|---|---|---|---|---|---|---|---|
| asphalt 5.45 wt % (g) | 64 | | 64 | | 64 | | 64 | |
| glass fiber (g) | 0 | | 11 | | 22 | | 22 | |
| SI (mm) | wt % Passing | (g) | wt % Passing | (g) | wt % Passing | (g) | wt % Passing | (g) |
| 19 | 100.0 | 0 | 100.0 | 0 | 100.0 | 0 | 100.0 | 0 |
| 13 | 93.0 | 78 | 93.0 | 78 | 93.0 | 78 | 93.0 | 78 |
| 10 | 56.0 | 413 | 56.0 | 413 | 32.0 | 413 | 56.0 | 413 |
| 4.75 | 32.0 | 279 | 32.0 | 268 | 18.0 | 268 | 33.0 | 156 |
| 2.36 | 18.0 | 156 | 18.0 | 156 | 12.0 | 156 | 19.0 | 78 |
| 1.18 | 11.0 | 78 | 11.0 | 78 | 9.0 | 67 | 12.0 | 33 |
| 0.6 | 8.0 | 33 | 8.0 | 33 | 6.0 | 33 | 9.0 | 33 |
| 0.3 | 5.0 | 33 | 5.0 | 33 | 4.0 | 33 | 6.0 | 22 |

TABLE 1-continued

| added amount | 0 wt % (Comparative Example 1) | | glass fiber: 1 wt % (Comparative Example 2) | | glass fiber: 2 wt % (Comparative Example 3) | | fiber reinforcing material: 2 wt % + scrap reinforcing material: 2 wt % (Exemplary Embodiment 1) | |
|---|---|---|---|---|---|---|---|---|
| 0.15 | 3.0 | 22 | 3.0 | 22 | 2.0 | 22 | 4.0 | 22 |
| stone powder filler | 7.0 | 22 | 1.0 | 22 | 2.0 | 22 | 0 | 0 |
| coating scrap | 0 | 0 | 0 | 0 | 0 | 0 | 2.0 | 22 |

[a](Comparative Example 1): glass fiber: 0 wt %
[b](Comparative Example 2): glass fiber: 1 wt %
[c](Comparative Example 3): glass fiber: 2 wt %
[d](Exemplary Embodiment 1): fiber reinforcing material: 2 wt % + scrap reinforcing material: 2 wt %

It was confirmed that a hot-mix asphalt mixture in which a glass fiber composite reinforcing material of the present invention (Exemplary Embodiment 1) was mixed has effects of increasing interlocking force between aggregates according to uniform dispersion of glass fibers, increasing the toughness of a mixture according to a bridging effect between aggregates, and increasing viscosity of an asphalt binder by a polypropylene resin. As a result, when road construction is performed using the hot-mix asphalt mixture according to the present invention, there are advantageous effects of increasing structural durability by solving problems such as plastic deformation, fatigue cracking, pothole damage and the like, and of economic efficiency by not using a stone powder when a hot asphalt is produced in a plant.

The hot-mix asphalt mixture in which the glass fiber composite reinforcing material according to the present invention is mixed is useable for a surface layer or a base layer of new asphalt road pavement, and also is useable as a material for an overlay layer when existing asphalt road pavement or plain concrete road pavement is repaired. Particularly, when the hot-mix asphalt mixture is used for overlay repair in plain concrete road pavement in which transverse joints are formed, effects of reducing noise, roughness, easiness of maintenance and repair, economic efficiency and the like, all of which are advantages of general asphalt road pavement, may be expected, and also there is an effect of preventing reflective cracking mainly occurring at transverse joints in the concrete road pavement according to an increase in toughness of a mixture and viscosity of a polypropylene resin modified binder by the addition of glass.

Effects of a glass fiber composite reinforcing material of the present invention will be described in detail as follows.

It was confirmed that there are effects of improving wet mixing workability by polypropylene (PP) of a scrap reinforcing material 1 and a fiber reinforcing material 2, and of increasing viscosity of an asphalt binder.

Thermoplastic polypropylene (PP) is composed of only carbon and hydrogen, and exhibits characteristics in which a specific gravity is 0.90 to 0.92 g/cm$^3$, an elastic modulus is 1.1 to 1.3 GPa, and a melting point is about 150 to 160° C.

An asphalt binder is composed of 80% or more carbon and hydrogen, and structural performance of a mixture for road pavement is exhibited by adding polypropylene to general asphalt having a specific gravity of 0.98 to 1.00 g/cm$^3$.

A change in rheological properties of an existing asphalt binder (Comparative Example 1) and the asphalt binder of Exemplary Embodiment 1 which is added with a scrap reinforcing material 1 and a fiber reinforcing material 2, which are coated with polypropylene, was observed using a dynamic shear rheometer. A KS F 2393 test method using a dynamic shear rheometer for rheological properties of asphalt was used, wherein sample molds was made with the asphalt of Comparative Example 1 and Exemplary Embodiment 1, and then dynamic shear rheological properties were tested at a temperature of 64° C., 70° C., and 72° C.

Figure 6:
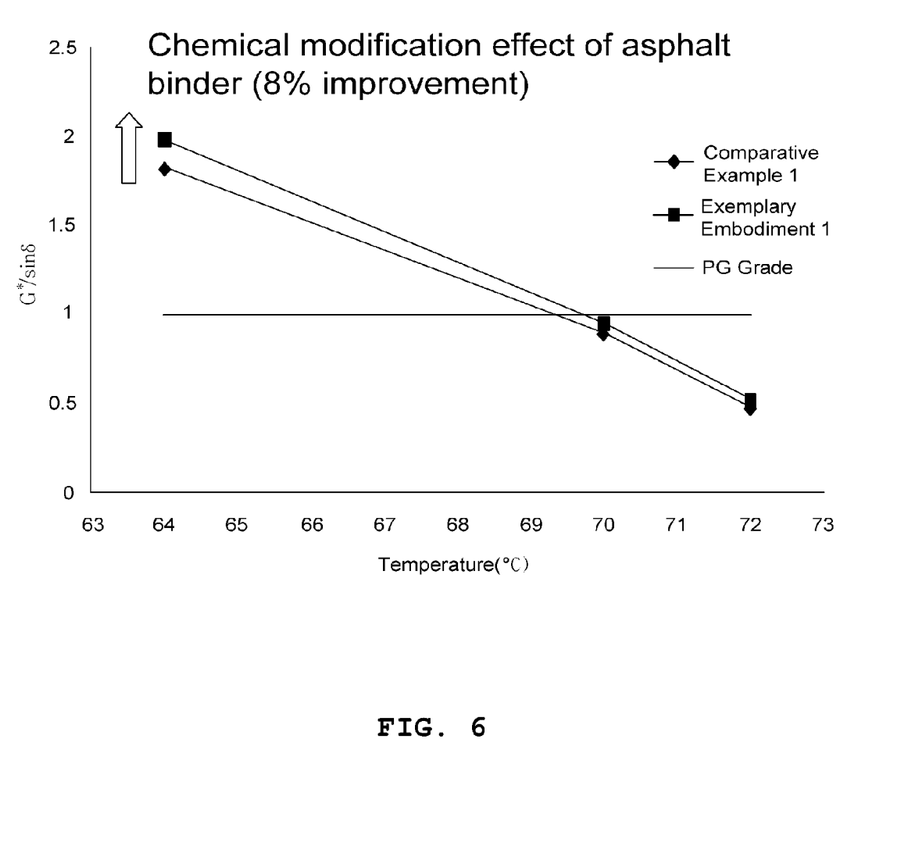
FIG. 6 is a graph illustrating a test result of the dynamic shearing property of an asphalt binder mixed with a polypropylene resin reinforcing material according to the present invention and an existing general asphalt binder.

Through a test result of dynamic shear properties illustrated in FIG. 6, it was confirmed that a maximum shear stress was improved by 8% on average by an increase in viscosity in Exemplary Embodiment 1 compared to Comparative Example 1.

Also, three specimens for each of Comparative Examples 1, 2, 3, and Exemplary Embodiment 1 were made, and then indirect tensile strength was measured in a temperature environment of 25° C.

Figure 7:
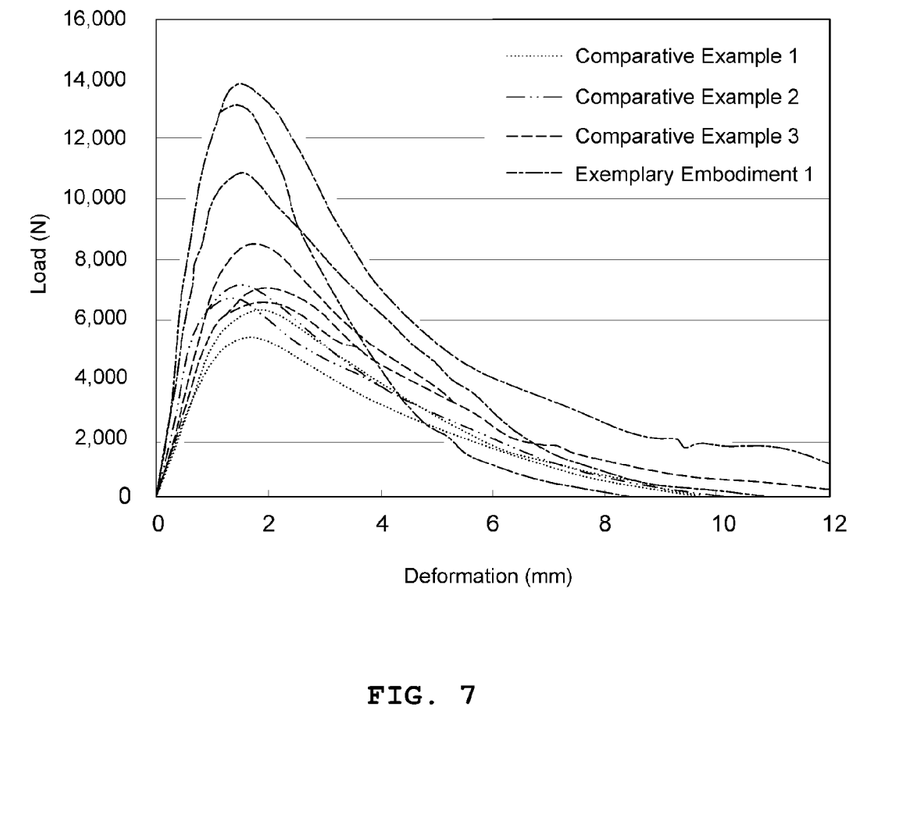
FIG. 7 is a graph illustrating results of load-deformation by tests on indirect tensile strength of a hot-mix asphalt mixture mixed with a composite reinforcing material according to the present invention and an existing general hot asphalt mixture.
Figure 8:
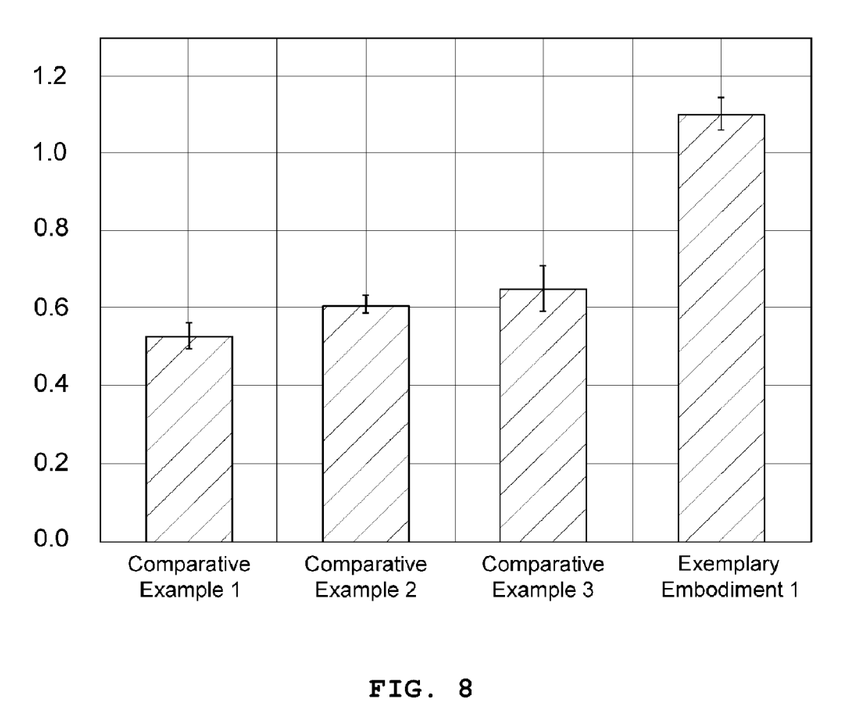
FIG. 8 is a graph illustrating an average of indirect tensile strength by tests on indirect tensile strength of a hot-mix asphalt mixture mixed with a composite reinforcing material according to the present invention and an existing general hot asphalt mixture.
Figure 9:
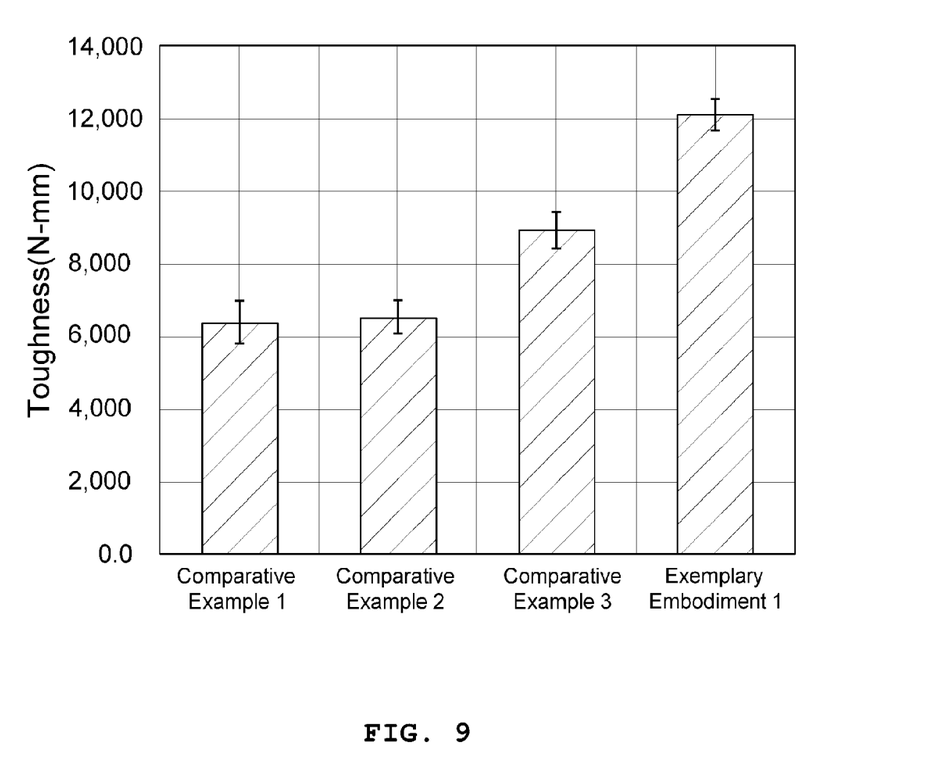
FIG. 9 is a graph illustrating a toughness value by tests on indirect tensile strength of a hot-mix asphalt mixture mixed with a composite reinforcing material according to the present invention and an existing general hot asphalt mixture.

FIGS. 7 to 9 are graphs illustrating test results of indirect tensile strength, wherein according to these test results, maximum tensile strength and strain energy (area under the curve in FIG. 7) were measured to be the largest in the specimen of Exemplary Embodiment 1.

Also, for confirming a property of increase in indirect tensile strength in Comparative Examples 1, 2, 3, and Exemplary Embodiment 1, a relative comparison of a completely dried sample and a sample subjected to a freezing and thawing process was performed. A freezing and thawing process is performed in order to evaluate resistance performance of a mixture used at a construction site with respect to changes in outdoor temperature and moisture. In the case of a freezing and thawing process, a water saturation state of a specimen is recorded using a water saturation formula, and a water saturation state of a specimen should be within a range of 70 to 80%. When a water saturation state of a specimen is less than 70%, a saturation process is performed again, and when a water saturation state of a specimen is more than 80%, a specimen is discarded. A 70 to 80% saturated specimen is covered with plastic wrap and then the specimen and 10±0.5 ml of water are added into a bag capable of being sealed, and frozen in a freezer at −18±3° C. for 16 hours. After freezing, the specimen thawed for 24±1 hours is immersed in a water tank of 25±0.5° C. for 2 hours±10 minutes, and then a test on indirect tensile strength is performed.

Figure 10:
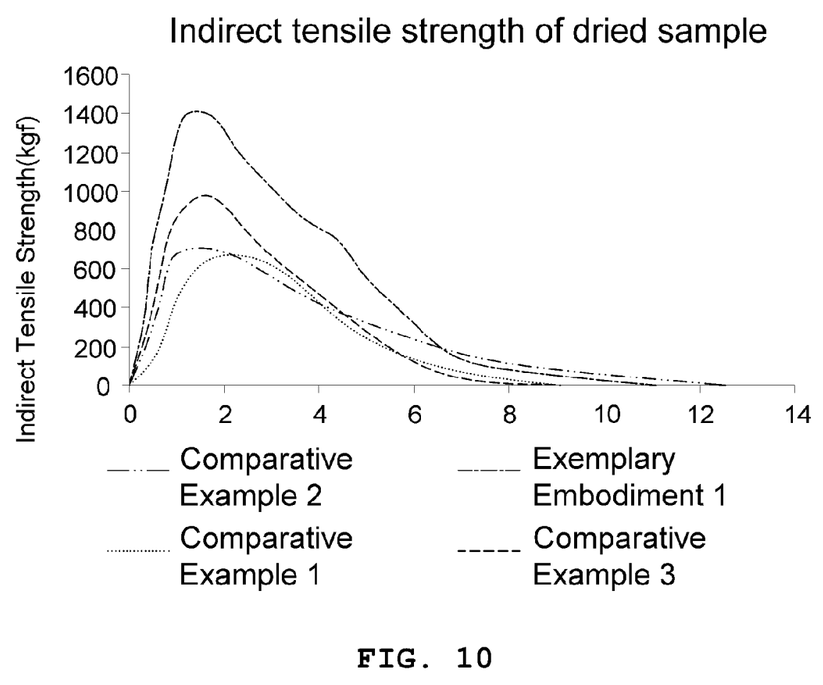
FIG. 10 is a graph illustrating indirect tensile strength on a completely dried sample of a hot-mix asphalt mixture mixed with a composite reinforcing material according to the present invention and an existing general hot asphalt mixture.

In the case of indirect tensile strength of a completely dried sample (referring to FIG. 10), maximum indirect tensile strength of the specimen of Exemplary Embodiment 1 increased a maximum 2.0 times or more compared to a general specimen (Comparative Examples 1, 2, and 3), this indicates that resistance performance in a tensile direction was improved by producing a bridging effect inside the specimen of Exemplary Embodiment 1. A reinforcement effect in Exemplary Embodiment 1 in which glass fiber is added is 2.0 times or more considering that indirect tensile strength of a dried sample is about 1.2 to 1.3 times increased, and it is judged that there is a very large effect of increasing strength.

Figure 11:
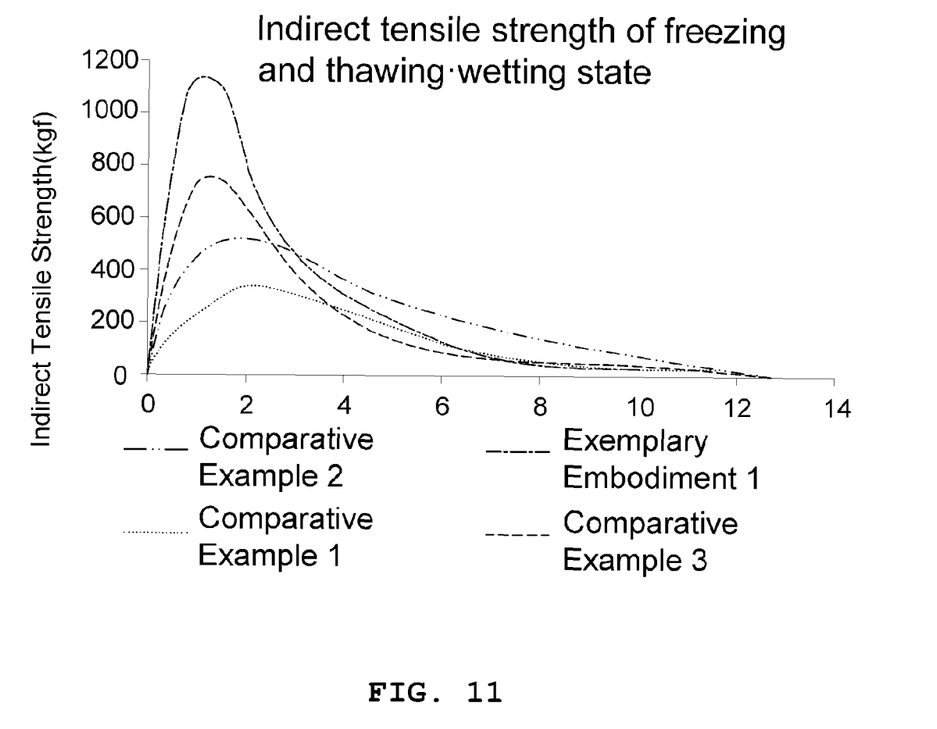
FIG. 11 is a graph illustrating indirect tensile strength on a freeze-thaw sample of a hot-mix asphalt mixture mixed with a composite reinforcing material according to the present invention and an existing general hot asphalt mixture.

In the case of indirect tensile strength of a specimen subjected to a freezing and thawing process (referring to FIG. 11), the specimen of Exemplary Embodiment 1 exhibited a maximum tensile strength of 1.0 MPa or more even after freezing, and maximum indirect tensile strength increased a maximum 3.0 times compared to a general specimen (Comparative examples 1, 2, and 3). It can be indirectly seen that when the specimen of Exemplary Embodiment 1 reinforced by glass fiber and glass fiber scrap is subjected to a freezing and thawing process repeatedly, the specimen is still very effective.

Maximum indirect tensile strength is calculated while targeting a dried sample and a specimen subjected to a freezing and thawing process, and as a result, when the specimen of Exemplary Embodiment 1 exhibits maximum effects, a particle size of an aggregate may seem coarse grade and open grade. It is judged that a bridging effect is well exhibited by positioning glass fiber and scrap in pores of a coarse graded and open graded aggregate inside a specimen. Therefore, the use of a glass fiber and scrap substituted mixture (Exemplary Embodiment 1) is expected to exhibit greater effects particularly in mixtures such as a coarse graded mixture, stone mastic asphalt (SMA), a drainage mixture, and open grade friction course, rather than in a dense graded mixture.

Figure 12:
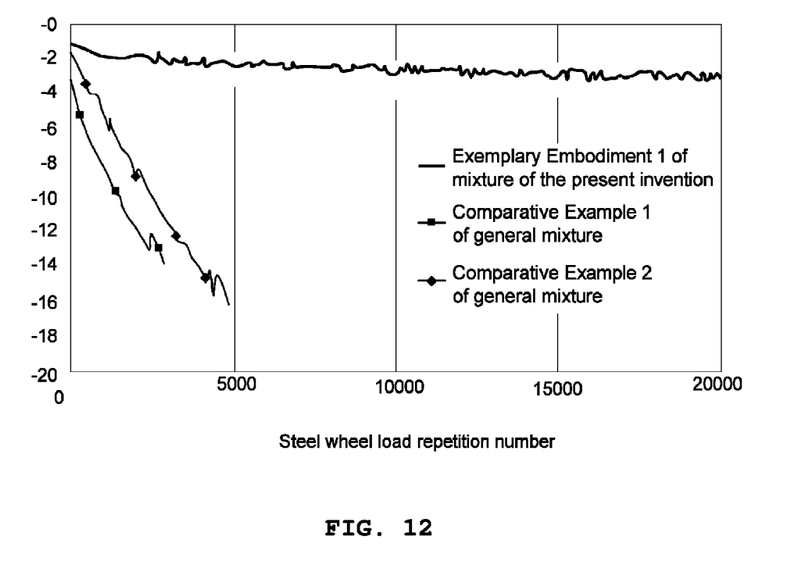
FIG. 12 is a graph of a test in which a hot-mix asphalt mixture mixed with a composite reinforcing material according to the present invention and an existing general hot-mix asphalt mixture are immersed in 50° C. water, and the degree of deformation on a contact surface of a steel wheel is recorded while applying a steel wheel load repeatedly.

A Hamburg Wheel Tracking Test (AASHTO T324, TEX-242-F) which is prescribed in the USA for a glass fiber and glass fiber scrap substituted hot asphalt mixture (Exemplary Embodiment 1) according to the present invention and a general hot asphalt mixture is performed, and as a result, when about 71 kg of a steel wheel load is applied repeatedly on a upper surface of both asphalt mixture specimens in 50° C. water at the same time, the glass fiber and glass fiber scrap substituted hot asphalt mixture according to the present invention generates a very small deformation of 3.3 mm on average while a load is applied repeatedly 20,000 times, whereas a general hot asphalt mixture generates a deformation of 15 mm or more, and thus a specimen is totally damaged before the load is applied repeatedly 5,000 times (referring to FIG. 12).

The present invention has been described in detail with reference to an exemplary embodiment. However, it will be understood by those skilled in the art that various substitutions, additions, and changes may be made within a range without departing from the above-described technological spirit, and the changed exemplary embodiment is also included in the scope of the present invention defined by the appended claims.

INDUSTRIAL APPLICABILITY

The present invention can be applicable to paving materials such as an asphalt mixture and the like or composite materials for architecture or civil engineering.

What is claimed is:

1. A glass fiber composite reinforcing material comprising:
   a pellet-shaped scrap reinforcing material (1) in which glass fiber scrap made by pulverizing glass fiber is coated with an outer covering material; and
   a rod-shaped fiber reinforcing material (2) in which a glass fiber bundle having a plurality of glass fiber strands is coated with a resin material,
   wherein the outer covering material of the pellet-shaped scrap reinforcing material (1) is an asphalt binder.

2. The glass fiber composite reinforcing material according to claim 1, wherein the resin material of the rod-shaped fiber reinforcing material (2) is polypropylene.

3. The glass fiber composite reinforcing material according to claim 1, wherein the rod-shaped fiber reinforcing material (2) has a length of 10 to 20 mm.

4. The glass fiber composite reinforcing material according to claim 1, further comprising:
   a resin reinforcing material (3) in the form of a grain composed of a polypropylene resin.

5. A hot-mix asphalt mixture,
   wherein the hot-mix asphalt mixture is made by mixing a glass fiber composite reinforcing material, aggregates, and an asphalt binder,
   wherein the glass fiber composite reinforcing material comprises:
   a pellet-shaped scrap reinforcing material (1) in which glass fiber scrap made by pulverizing glass fiber is coated with an outer covering material; and
   a rod-shaped fiber reinforcing material (2) in which a glass fiber bundle having a plurality of glass fiber strands is coated with a resin material,
   wherein, among the glass fiber composite reinforcing material, the pellet-shaped scrap reinforcing material (1) is mixed in an amount of 1 to 2 wt % based on a total weight of the hot-mix asphalt mixture, and the rod-shaped fiber reinforcing material (2) is mixed in an amount of 1 to 2 wt % based on a total weight of the hot-mix asphalt mixture.

* * * * *